UNITED STATES PATENT OFFICE.

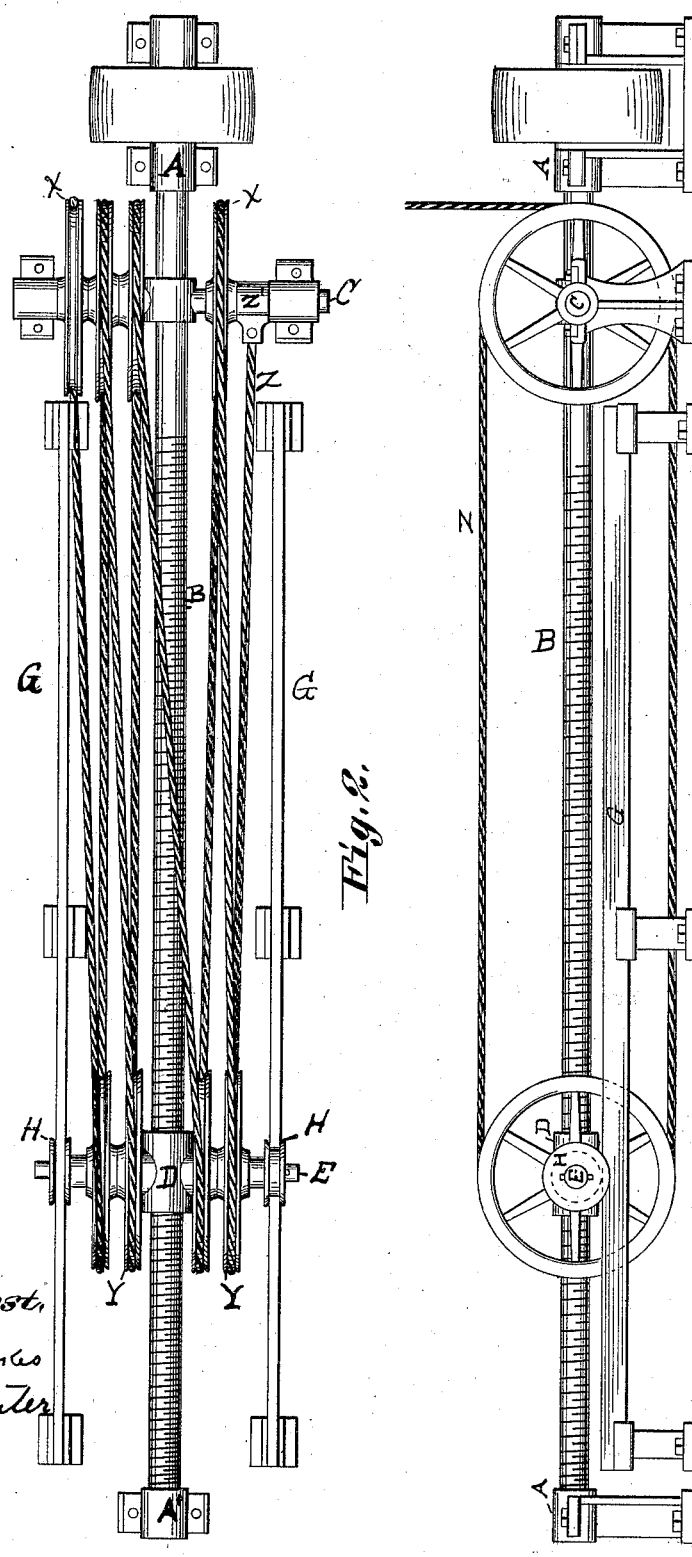

RUBEN B. AYRES, OF ST. LOUIS, MISSOURI.

ELEVATOR-HOISTING DEVICE.

SPECIFICATION forming part of Letters Patent No. 330,865, dated November 24, 1885.

Application filed June 22, 1885. Serial No. 169,438. (No model.)

*To all whom it may concern:*

Be it known that I, RUBEN B. AYRES, of the city of St. Louis, State of Missouri, have made a certain new and useful Improvement in Elevator-Hoisting Devices, of which the following is a full, clear, and exact description, reference being had to the accompanying drawings, forming part of the same, in which—

Figure 1 is a top view of my improved elevator-hoisting device. Fig. 2 is a side elevation of the same.

The construction and operation of my improvement is as follows: Mounted in bearings A A, preferably in a horizontal position threaded along its entire length is a shaft, B. At the end of shaft B nearest the bearing A is firmly attached, so as to revolve in suitable bearings, a shaft, C. On this shaft C are mounted, preferably, four wheels grooved about their periphery to receive a rope. On the shaft B, and on the side of shaft C in the direction of A', and circling shaft B, is a threaded cylinder, D, made to revolve about shaft B, fitting into and following in the line of the threads of shafts B. Attached to cylinder D in any suitable manner, so as to practically form part of the same, and to follow cylinder D in the direction of its motion up or down line of shaft B, is a shaft, E. On this shaft E, revolving with it, are a number of wheels, Y Y, grooved about their peripheries to receive a rope. On either side of shaft B are tracks or ways G, running parallel with shaft B, and the object of these tracks G is to provide a way or lines upon which grooved wheels H H at either end of shaft E may easily follow. At either extreme end of shaft B, preferably at the ends nearest bearing A, suitable driving-power, preferably in this instance by a belt and pulley, is applied. A rope, Z, at one end is attached firmly, preferably to a loose collar, Z', on shaft C. This rope, after being alternately wound upon wheels Y and X, is finally connected with the elevator to be operated upon.

The operation of my invention is as follows: When driving-power is applied to shaft B, in any suitable manner, preferably as hereinbefore stated, shaft B, which is threaded as stated, will revolve. As it revolves in one direction—for instance in the direction of bearing A'—the result will be that the threaded cylinder D, to which shaft E, having wheels Y attached, the weight of the elevator bearing upon the lines of rope Z, (shown in the drawings,) will cause the cylinder D, shaft E, wheels Y, and grooved wheels H to follow along on the line of rails or track G in the direction of bearing A. When the direction of rotation of shaft E is reversed, the cylinder D and shaft E, carrying-wheels Y and grooved wheels H, will move in the opposite direction and toward bearing A', and this operation will draw upon rope Z, instead of allowing it to give to the weight of the elevator, and will draw the elevator up.

What I claim is—

In an improvement in elevator-hoisting devices, the combination of a threaded shaft, B, to which rotary motion is imparted by any of the well-known mechanisms to that end, bearings A A', shaft C, hung in fixed bearings, grooved wheels X, threaded cylinder D, firmly attached to shaft E, to which in turn are attached grooved wheels Y and track-wheels H, tracks G, and rope Z, the whole combined and operating to raise or lower an elevator, substantially as described, and for the purposes specified.

In testimony whereof I have affixed my signature, in presence of two witnesses, this 6th day of May, 1885.

RUBEN B. AYRES.

Witnesses:
PAUL BAKEWELL,
J. W. CROOKES.